US011979744B2

(12) United States Patent
Henry et al.

(10) Patent No.: US 11,979,744 B2
(45) Date of Patent: May 7, 2024

(54) FEDERATION POLICY EXCHANGE

(71) Applicant: Cisco Technology, Inc., San Jose, CA (US)

(72) Inventors: Jerome Henry, Pittsboro, NC (US); Louis G. Samuel, Gloucester (GB); Mark Grayson, Maidenhead (GB); Bart A. Brinckman, Nevele (BE); Robert E. Barton, Richmond (CA); Carlos M. Pignataro, Cary, NC (US); Nagendra Kumar Nainar, Morrisville, NC (US); Matthew MacPherson, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/443,287

(22) Filed: Jul. 23, 2021

(65) Prior Publication Data

US 2023/0021627 A1 Jan. 26, 2023

(51) Int. Cl.
| | |
|---|---|
| *G06F 7/04* | (2006.01) |
| *H04L 9/40* | (2022.01) |
| *H04W 12/06* | (2021.01) |
| *H04W 12/08* | (2021.01) |
| *H04W 12/69* | (2021.01) |

(52) U.S. Cl.
CPC ......... *H04W 12/08* (2013.01); *H04L 63/0815* (2013.01); *H04W 12/06* (2013.01); *H04W 12/69* (2021.01)

(58) Field of Classification Search
CPC ..... H04W 12/08; H04W 12/69; H04W 12/06; H04L 63/0815

USPC ........................................................... 726/2
See application file for complete search history.

(56) References Cited

U.S. PATENT DOCUMENTS

| | | | |
|---|---|---|---|
| 2003/0172090 A1 | 9/2003 | Asunmaa et al. | |
| 2008/0016232 A1* | 1/2008 | Yared ................. | H04L 63/0815 709/229 |
| 2013/0095789 A1 | 4/2013 | Keevill et al. | |

(Continued)

OTHER PUBLICATIONS

International Search Report and Written Opinion for PCT Application No. PCT/US2022/074035, dated Nov. 9, 2022.

*Primary Examiner* — Jeffrey C Pwu
*Assistant Examiner* — Samuel Ambaye
(74) *Attorney, Agent, or Firm* — Patterson + Sheridan, LLP

(57) ABSTRACT

Federation policy exchange is provided in response to receiving a sharing query from an Access Point (AP) indicating that an associated wireless network supports federated identities with data sharing, determining whether the sharing query is within sharing preferences; and in response to determining that the sharing query is within the sharing preferences, transmitting, to the AP, a positive response for identity sharing that authorizes collection and sharing of identity data with at least one entity identified in a sharing policy for the associated wireless network. In various embodiments, federation policy exchange includes transmitting a support notification, via an AP, indicating support for federated identities with data sharing within a wireless network associated with the AP; and in response to receiving a first identify sharing preference from a User Equipment (UE) that indicates that negotiation is preferred, transmitting a sharing policy for the wireless network to the UE.

18 Claims, 10 Drawing Sheets

(56) References Cited

U.S. PATENT DOCUMENTS

| | | | |
|---|---|---|---|
| 2015/0373554 A1 | 12/2015 | Freda et al. | |
| 2017/0099321 A1 | 4/2017 | Frahim et al. | |
| 2017/0142076 A1 | 5/2017 | Ford et al. | |
| 2018/0343609 A1* | 11/2018 | Gu | H04W 48/20 |
| 2019/0215692 A1* | 7/2019 | Grayson | H04L 63/102 |
| 2020/0059426 A1 | 2/2020 | Raleigh et al. | |
| 2020/0099631 A1* | 3/2020 | Cheng | H04L 47/821 |
| 2020/0163013 A1* | 5/2020 | Grayson | H04W 48/18 |

* cited by examiner

FEDERATION POLICY EXCHANGE

TECHNICAL FIELD

Embodiments presented in this disclosure generally relate to network management. More specifically, embodiments disclosed herein provide for the exchange and selection of identities and supplemental data to gain access to a network or network-provided service from one of several potential identities.

BACKGROUND

Various networks and services allow users, via associated User Equipment (UE), also referred to stations (STA) or mobile stations, to gain access to the services by associated identities. For example, a first service can provide access once a user confirms an identity or profile provided by the first service (e.g., a username/password combination). However, services can join together to share credentials and user identities to determine how and whether to provide access to an associated service based on an identity used by other services in an identity federation. With the deployment of identity federations, each user can amass an increasingly larger set of possible identities that could be used to onboard to a given network or other federated service.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

One embodiment presented in this disclosure is a method comprising: in response to receiving a sharing query from an Access Point (AP) indicating that an associated wireless network supports federated identities with data sharing, determining whether the sharing query is within sharing preferences; and in response to determining that the sharing query is within the sharing preferences, transmitting, to the AP, a positive response for identity sharing that authorizes collection and sharing of identity data with at least one entity identified in a sharing policy for the associated wireless network.

One embodiment presented in this disclosure is a method comprising: transmitting a support notification, via an Access Point (AP), indicating support for federated identities with data sharing within a wireless network associated with the AP; and in response to receiving a first identify sharing preference from a User Equipment (UE) that indicates that negotiation is preferred, transmitting a sharing policy for the wireless network to the UE.

One embodiment presented in this disclosure is a device comprising: a processor; a memory including instructions that when executed by the processor configure the device to: in response to receiving a sharing query from an Access Point (AP) indicating that an associated wireless network supports federated identities with data sharing, determine whether the sharing query is within sharing preferences; and in response to determining that the sharing query is within the sharing preferences, transmit, to the AP, a positive response for identity sharing that authorizes collection and sharing of identity data with at least one entity identified in a sharing policy for the associated wireless network.

EXAMPLE EMBODIMENTS

The present disclosure provides for federation policy exchange to manage several valid identities for a user seeking to gain access to a network or network-provided service. The herein described federation policy exchange enables a user, via an associated user equipment (UE), to securely exchange credentials with one or more Identity Providers (IdP), thus keeping the credentials hidden from the access provider. These hidden identities, however, can provide various additional benefits to the user, the service provider, or various third-party partners if sharing of the identities is permitted. Accordingly, the present disclosure provides for the UE (on behalf of the user) to share elements of one or more identities with a service provider (e.g., a venue offering a wireless network) and the partners of the access provider (e.g., to provide user incentives based on user identity), while still retaining control of the user identities.

Figure 1:
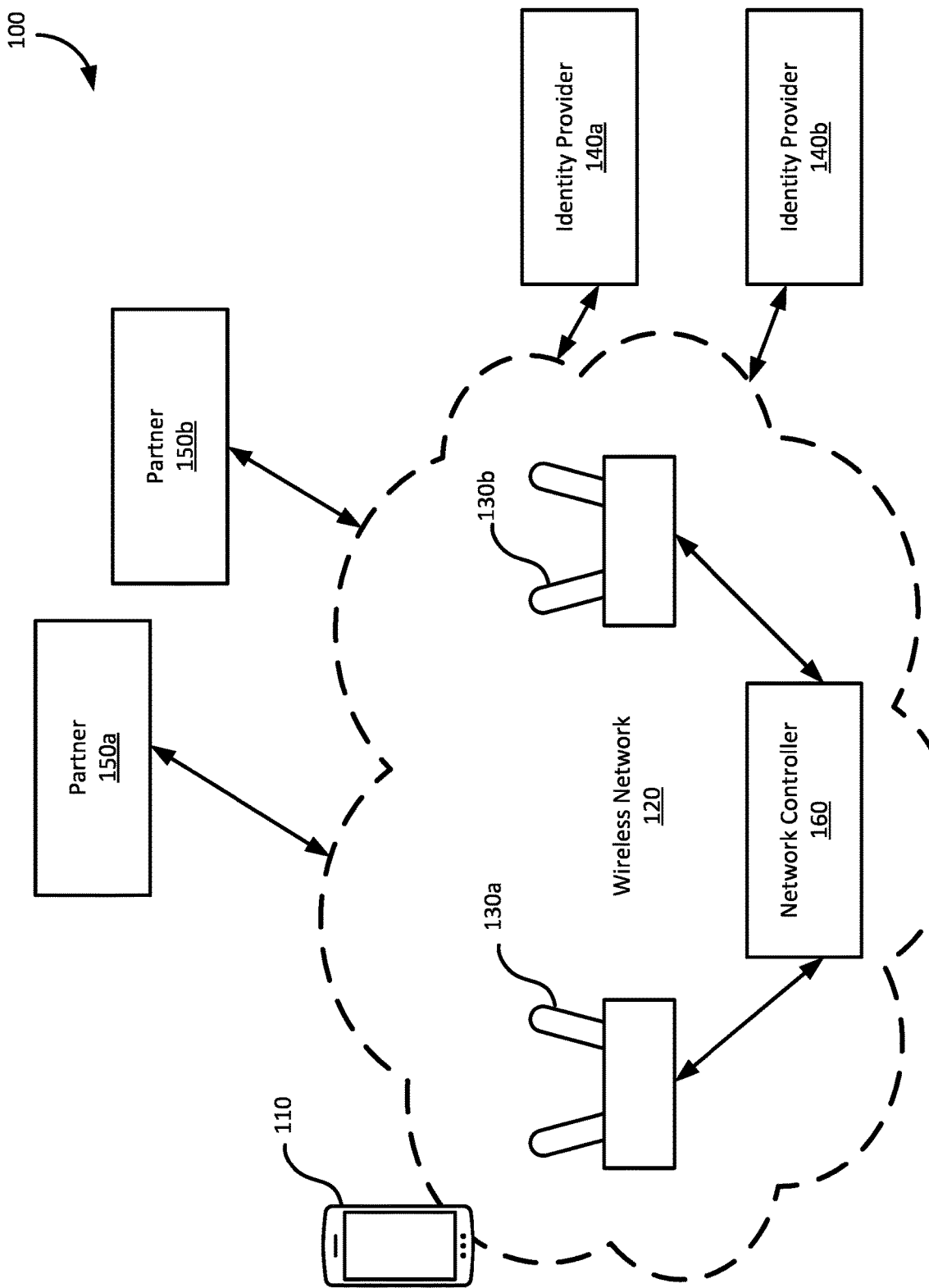
FIG. 1 illustrates a network environment that supports federated policy exchange, according to embodiments of the present disclosure.

FIG. 1 illustrates a network environment 100 that supports federated policy exchange, according to embodiments of the present disclosure. In FIG. 1, a UE 110 seeks to gain access to a wireless network 120, such as a cellular or Wi-Fi based wireless network offered to users in a public or private venue. The service provider can deploy the wireless network via one or more Access Points (APs) 130*a-b* (generally or collectively, AP 130), and set various controls on the wireless network 120 to confirm the identity of the user (via the UE 110) before permitting access. In various embodiments, the wireless network 120 includes a network controller 160 that is in communication with the APs 130 to coordinate network management among the APs 130, although the APs 130 can also manage the network among themselves, thus omitting the network controller 160 in some embodiments.

The UE 110 may include any computing device that is configured to wirelessly connect to one or more APs 130. Example UE 110 can include, but are not limited to: smart phones, feature phones, tablet computers, laptop computers, desktop computers, Internet of Things (IoT) devices, and the like. In various embodiments, the UE 110 can also be referred to as a station (STA), a client device (CD), or an endpoint. Example hardware as may be included in a UE 110 is discussed in greater detail in regard to FIG. 6.

The APs 130 can offer wireless communication sessions in the wireless network 120 according to various Radio Access Technologies and communications standards such as, but not limited to, "Wi-Fi" networking according to the various families, sub-standards, and derivatives of the IEEE 802.11 standard, cellular networking including various generations and subtypes thereof, such as, Long Term Evolution (LTE) and Fifth Generation New Radio (5G NR)) networks, Citizens Broadband Radio Service (CBRS) networks, or the like. Example hardware as may be included in an AP 130 is discussed in greater detail in regard to FIG. 6.

The network controller 160, if included, may include any computing device or cloud based service that is configured to interface with two or more APs 130 to coordinate how spectrum is shared in the environment 100. The network controller 160 can be provided on a separate computing device connected to the individual APs 130 via wired or wireless communications, may be included with a "central" or "commander" AP 130, or may be provided in an ad hoc arrangement via a collective of two or more APs 130 negotiating among themselves for network management. Example hardware as may be included in a network controller 160 is discussed in greater detail in regard to FIG. 6.

When a UE 110 attempts to gain access to the wireless network 120 and associate with an AP 130, the network provider may request that the UE 110 provide an identity for the user so that services can be tracked and allocated properly to the UE 110. In various embodiments, the UE 110 can authenticate directly with the wireless network 120 (e.g., using an identity and credentials set up with the network provider) or can use an externally verified identity that is confirmed via one or more identity providers 140*a-b* (generally or collectively, identity provider 140). When a service provider (e.g., the network provider) allows for the use of a third-party identity provider 140 (also referred to as an IdP) to gain access to the provider's service (e.g., the wireless network 120), the service provider is said to offer a federated service or participate in an identity federation.

The identity providers 140 are entities that users can create and manage various identities through which the network provider may delegate authentication function to. For example, the user can register with an identity provider 140 of a social network to gain access to the wireless network 120 by authenticating with the social network, which in turn, vouches for the authenticity and identity of the user to the network provider. Accordingly, the network provider, as a service provider, can avoid the need to set up individual accounts for each user attempting to gain access to the wireless network 120, and instead rely on one or more trusted identity providers 140 to verify the identity of the requesting users. In various embodiments, the services of an identity provider 140 can be an on-premises authentication service shared by several service providers in the wireless network 120 or an off-premises authentication service used by several service providers offering one or several wireless networks 120. Example hardware as may be included in a server providing the services of an identity provider 140 is discussed in greater detail in regard to FIG. 6.

The identity of the user of the UE 110 is generally kept private between the identity provider 140 and the network provider for use in gaining access to the wireless network via a confirmed identity. However, with the permission of the user, these identity data can be shared with one or more partners 150*a-b* (generally or collectively, partner 150) of the service provider. In various embodiments, the partners 150 can be identity providers 140 or other entities that have agreements in place with the service provider that wish to know when the user (via the associated UE 110) is at a given location or using a given service. With the permission of the user, the network provider can share these supplemental data with one or more authorized partners 150, and may provide various incentives to users who provide such sharing authorization (and not provide the incentives to users who withhold permission). Example hardware that may be included in a server providing the services of a partner 150 is discussed in greater detail in regard to FIG. 6.

Figure 2:
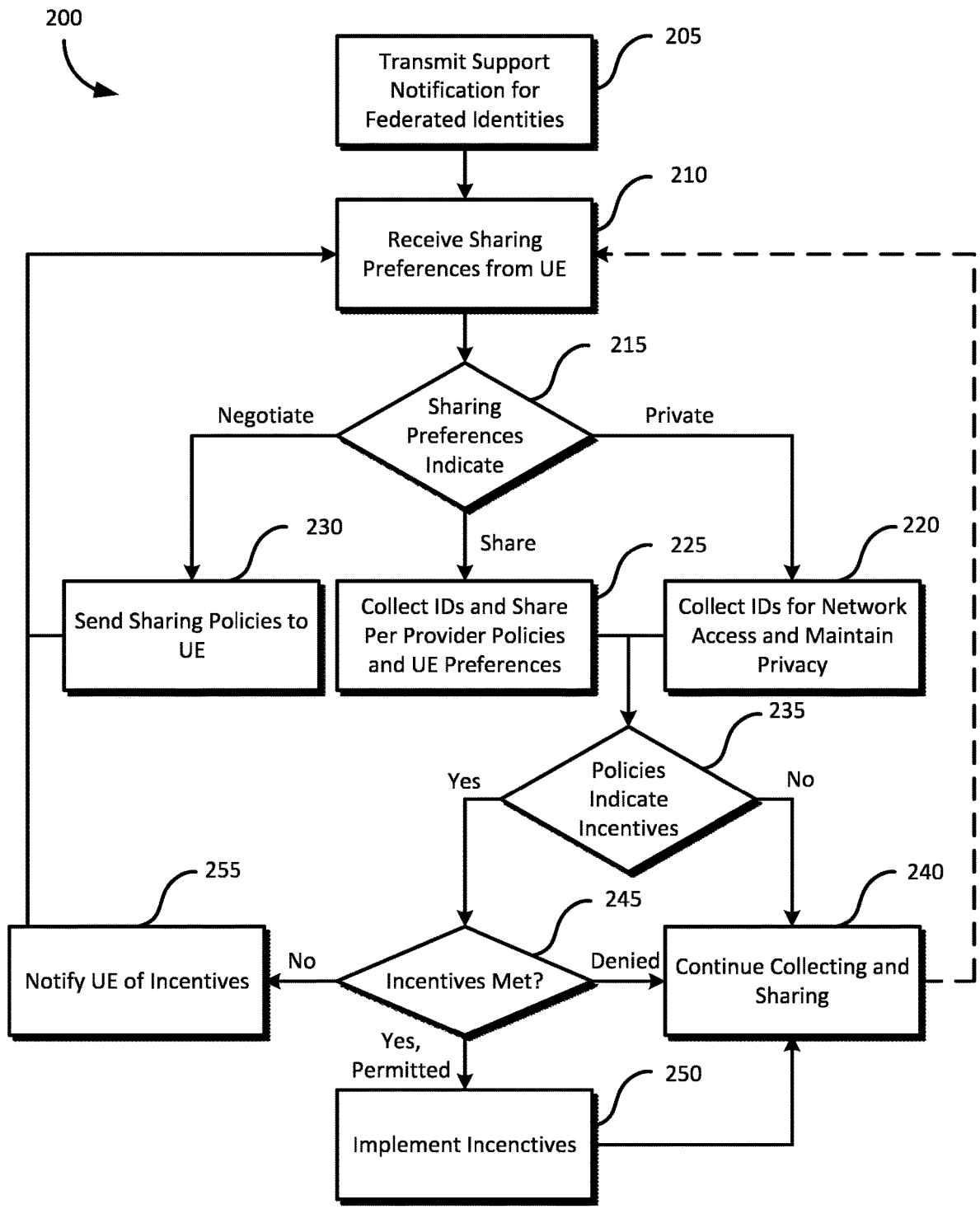
FIG. 2 is a flowchart of a method for expanded sharing of federated identities, according to embodiments of the present disclosure.

FIG. 2 is a flowchart of a method 200 for expanded sharing of federated identities, according to embodiments of the present disclosure. Method 200 begins a block 205, where an AP 130 transmits a notification to one or more UEs 110 that the wireless network 120 supports federated identities. In various embodiments, the support notification is includes in a network beacon that is broadcast to the environment, but the support notification can also be unicast to UE 110 as part of the onboarding process for the wireless network 120. The support notification can indicate various levels of identification required, permitted identity providers 140, and some or all of the sharing policies and sharing incentives offered by the wireless network 120. The sharing policies can indicate how often, when, with which partners 150, and what types of data are shared (and combinations thereof) to the UE 110. In various embodiments, the support notification can be sent via multiple messages at different times during the onboarding process, and can be updated as incentives change.

At block 210, the AP 130 receives a response from the UE 110 that indicates the sharing preferences for data sharing by the user. In various embodiments, the UE can express these preferences during authentication (e.g., via an Extensible Authentication Protocol (EAP) exchange), when associating with a given AP 130 in the wireless network 120, or via a browser session (e.g., via an Acceptable Use Policy (AUP) selection).

The preferences for identity sharing can be set via a message payload, via flags in header (or other designated) fields with specific meanings, and combinations thereof. For example, the UE 110 can express the user's identity sharing preferences to indicate for the network provider to: not share identity information beyond authentication purposes with the identity provider 140 and other already-entitled entities, to permit identity sharing with known (and approved) partners 150, to permit identity sharing at the network provider's discretion, and to query the network provider for more information before committing to a preference.

In various embodiments, the sharing preferences can be explicitly set or defined locally on the UE 110 by a user (or an administer on behalf of the user) or can be learned over time by the UE 110 based on user actions via a machine learning or other model. For example, the UE 110 can learn what sorts of service providers to share identities with based on a user tending to accept sharing in hotels, but not stadiums or shopping centers. In another example, the UE 110 can learn what sorts of identities and supplemental data the user permits to be shared based on a user frequently permitting a social media presence to be shared, but never permitting an email account to be shared. Accordingly, the UE 110 can infer the sharing policy based on past user actions to streamline responding to identity sharing policy queries, or defer to the user to control how or whether to share additional data with a service provider. Therefore, in various embodiments, the UE 110 can determine whether a query to share data is within the sharing policy by requesting a user inputs to authorize sharing the data (e.g., "network wishes to share data X; approve/deny"), referencing pre-defined settings or control panel options set by a user (or administer on behalf of the user), inferring the appropriate actions (e.g., approve/deny) based on historical user selections to approve or deny sharing, and combinations thereof.

At block 215, the AP 130 determines what the sharing policy preferences indicate for how to interact further with the UE 110. When the policy preferences indicate that the UE 110 will only share identities for authentication purposes, and identities should otherwise be kept private, method 200 proceeds to block 220. When the policy preferences indicate that the UE 110 will share identities, supplemental data (if collected), and analyses thereof either with certain partners 150 or at the network provider's discretion, method 200 proceeds to block 225. Otherwise, when the UE 110 indicates that the user wishes to know more about the service providers sharing policies before selecting an affirmative or negative response to sharing, method 200 proceeds to block 230.

At block 220, the AP 130 collects (and forwards to a selected identity provider 140) the identities and credentials provided from the UE 110 to authenticate the user. On receipt of authentication confirmation (or rejection) from the identity provider 140, the AP 130 grants (or rejects) access to the wireless network 120 based on the provided identity. The identity is used to track provision of services by the network provider, but is otherwise kept private. Accordingly, the network provider maintains the privacy of the user identity and other supplemental data when indicated by the UE 110, while offering the ability to share data to various UEs 110. Method 200 then proceeds to block 235.

At block 225, the AP 130 collects (and forwards to a selected identity provider 140) the identities and credentials provided from the UE 110 to authenticate the user. On receipt of authentication confirmation (or rejection) from the identity provider 140, the AP 130 grants (or rejects) access to the wireless network 120 based on the provided identity. The AP 130 may passively collect or actively query the UE 110 for further identities, application use statuses, locational data, or the like and forward those identity data and related supplemental data to various partners 150 based on the user-expressed policies (permitting or denying sharing with particular entities) or the service provider's discretionary judgement. Method 200 then proceeds to block 235.

At block 230, the AP 130 sends the provider policies for sharing data to the UE 110 as part of a negotiation process for whether to share data collected from the UE 110. In various aspects, the sharing model can express that the collected data are strictly for internal use by the network provider (e.g., for network monitoring/load balancing/analytics/support), to be shared with an explicit list of partners 150, or to be shared with requesting entities at the network provider's discretion (e.g., an undisclosed list of partners 150).

Once the UE 110 receives the provider's sharing policies, the UE 110 can determine how or whether to share data with the AP 130. Accordingly, method 200 returns to block 210 for the AP 130 to receive the sharing preferences from the UE 110. In various embodiments, when a response is not received from the UE 110 in a given timeframe, the AP 130 treats the lack of response as a denial of permission, and proceeds as though the UE 110 provided an explicit response to not share data.

At block 235, the AP 130 determines the network provider's sharing policies indicate whether any incentives are offered to UEs 110 that permit sharing. If no incentives are indicated, method 200 proceeds to block 240. Otherwise, when incentives are indicated, method 200 proceeds to block 245.

At block 240, the AP 130 continues collecting data as permitted by the preferences received from the UE 110 and sharing per the polices of the network provider agreed to by the user. In various embodiments, the user (via the UE 110) can extend or withdraw permission for sharing various data, or the AP 130 can extend incentive offers to encourage the user to share additional data. Accordingly, method 200 may return to block 210 in response to receiving updated sharing preferences from the UE 110 or updated policies/incentives from the network controller.

At block 245, the AP 130 determines whether the prerequisites for providing the indicated incentives have been met. In various embodiments, the prerequisites can include static data (e.g., data are not expected to change over time) such as the identity supplied for service access, an operating system of the UE 110, form factor details of the UE 110 (e.g., device model number, laptop/tablet/phone category, etc.), or the like that can be provided once to satisfy multiple checks for whether the prerequisites are satisfied. Additionally or alternatively, the prerequisites can include dynamic data (e.g., data that may change over time) such as UE 110 location, application use data, or the like. Accordingly, the AP 130 may receive the data used to compare against the prerequisites (and permission or denial to share those data) once and continually determine to provide or deny the incentives based on the data, or may from time to time send specific queries to gather additional dynamic data from the UE 110.

When the prerequisites have been met and the UE 110 has indicated permission to share the associated data, method 200 proceeds to block 250. When the UE 110 has denied the use of the data, regardless of whether the UE 110 actually satisfies the prerequisites, method 200 proceeds to block 240. Otherwise, when the prerequisites have not been met, method 200 proceeds to block 255.

At block 250, the AP 130 implements the incentives for the UE 110 that the UE 110 qualifies for according to the prerequisites. In various embodiments, the incentives can include additional data throughput or bandwidth, higher service level or quality of experience tiers, permissions for various applications, subsidized bandwidth costs, local edge process offloading, claimable vouchers (or links thereto) or virtual elements exchangeable for real world items. Method 200 then proceeds to block 240.

At block 255, the AP 130 notifies the UE 110 of the incentives available from the service provider. In various embodiments, the AP 130 can indicate the presence of incentives for sharing or the particular incentives and prerequisites therefor in greater detail, and may send one or multiple messages to the UE 110 to notify the UE 110 of the available incentives and gauge the interest of the user in receiving these incentives. For example, the AP 130 may notify the UE 110 that "additional incentives are available with additional sharing—respond if interested" to being a negotiation session, or may directly indicate that "incentive X is available for permitting sharing of information Y—respond if interested" to send a specific query to the UE 110. Method 200 then returns to block 210 for the UE 110 to respond (or not respond, which is treated as a negative response to or denial of the query) to the incentive notification.

Figure 3:
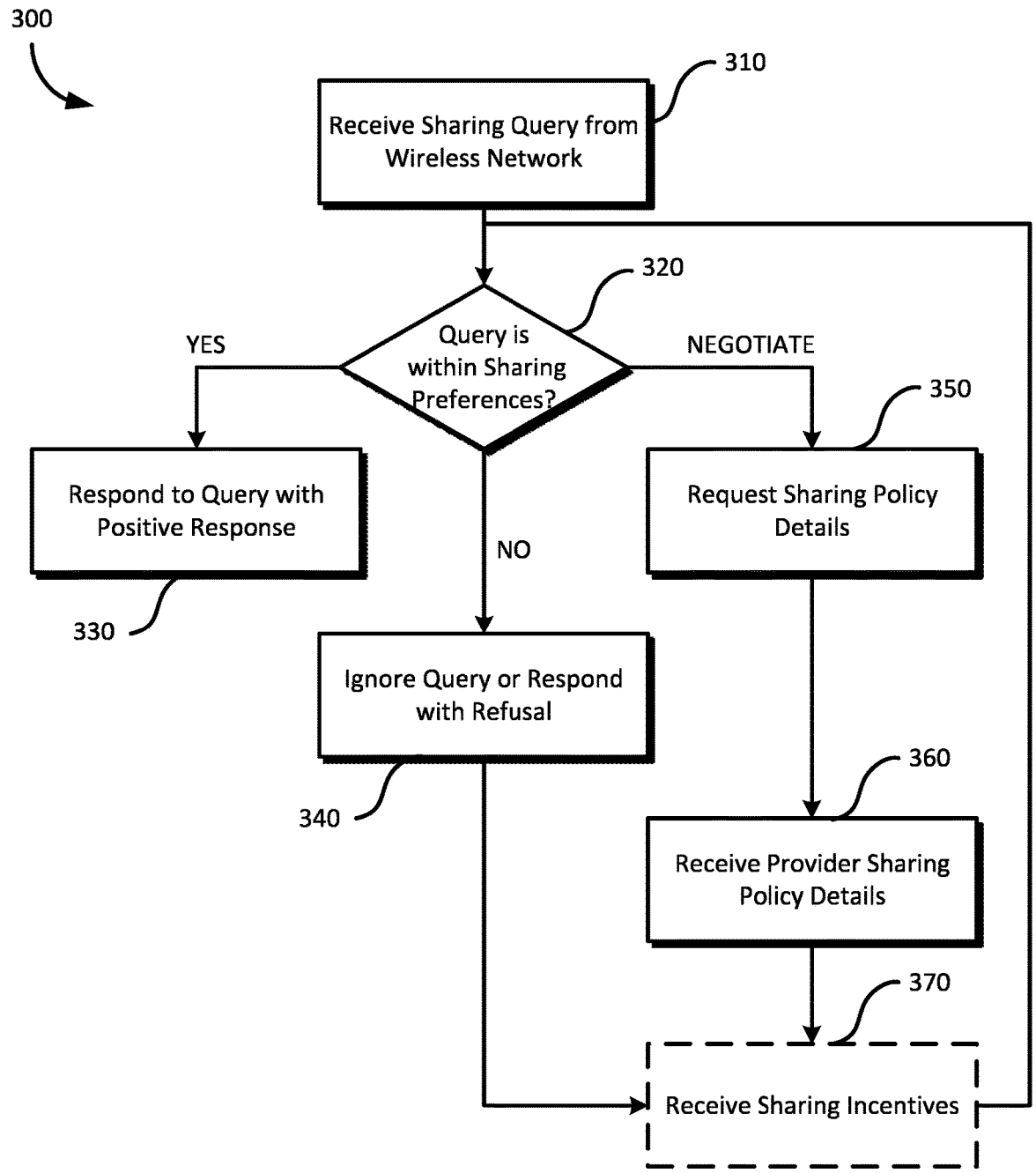
FIG. 3 is a flowchart of a method for a UE to handle identity sharing requests from a network that supports federated identities with data sharing, according to embodiments of the present disclosure.

FIG. 3 is a flowchart of a method 300 for a UE 110 to handle identity sharing requests from a network that supports federated identities with data sharing, according to embodiments of the present disclosure. Method 300 begins at block 310, where a UE 110 receives a sharing query from a wireless network 120. In various embodiments, one or more APs 130 in the wireless network 120 can transmit (via unicast or broadcast) initial notifications to the UE 110 that wireless network 120 supports data sharing via federated identities, which the UE 110 can respond to with an initial sharing preference. Additionally or alternatively, in some embodiments, the APs 130 can transmit subsequent queries to the UE 110 to request new data or confirm that the UE 110 maintains an initial sharing preference or has updated how or whether to share data related to the supplied identity and other supplemental data.

In various embodiments, the sharing query can be a general sharing query or a specific sharing query. A general sharing query requests that some or all of the data collected as part of providing access to the wireless network 120 is authorized for sharing. These data, and related analytics, can include the user identity, user location, data throughput (uplink or downlink) rates, and the like. A specific sharing query A can request data from the UE 110 related to the operating system, device form factor, additional identities for the user, active (or previously active) applications run by the UE 110, and other data that are in addition to or beyond what is transmitted and collected for provision of the basic service set (BSS) of the wireless network 120.

At block 320, the UE 110 determines whether the sharing query request data that are within the sharing preferences for the user of the UE 110. When the query is for data within the sharing preferences of the user, method 300 proceeds to block 330. When the query is for data outside of the sharing preferences, method 300 proceeds to block 340. When the UE 110 determines insufficient information about the sharing policies have been previously provided by the AP 130 to make an affirmative or negative response to the sharing query, method 300 proceeds to block 350.

In various embodiments, the UE 110 can transmit the sharing preferences to the AP 130 in response to receiving a specific query from the network to share certain data, as part of an onboarding operation (e.g., via an EAP exchange or when associating with a given AP 130 in the wireless network 120), or via a browser session and AUP selection. When the UE 110 sends the sharing preferences to the UE 110 the wireless network 120 can determine whether subsequent queries will be responded to positively or negatively without needed to send additional messages to the UE 110, potentially conserving bandwidth.

At block 320, the UE 110 determines the preference of the user for whether to share data based on the sharing policy provided by the AP 130 in block 315. Method 300 then returns to block 305 for the UE 110 to transmit the sharing policies for the UE 110 based on the currently known sharing policy of the service provider. In various embodiments, method 300 may repeat blocks 305-320 several times for the UE 110 to gain incrementally greater understanding of the service provider's sharing policy before making a final decision to share or not share data with the service provider. In various embodiments the query can be within (or outside of) the sharing preferences based on the level of sharing requested, the partners 150 with which the data are to be shared, an entity type of the requesting service provider, the type of data requested, and combinations thereof. The user of the UE 110 can specifically set various sharing policies or the UE 110 can learn over time the user's preferences (e.g., via a machine learning model) based on the user's acceptance or denial of various requests to automate responding to the queries.

Method 300 may return to block 320 after additional information is provided to the UE 110 regarding the service provider's sharing policy (per block 360) or the sharing incentives offered by the service provider (per block 370). After returning to block 320, the UE 110 may update the response selected based on the new information and may select further negotiation to learn additional details of the policies and incentives in the wireless network 120.

At block 330, the UE 110 responds to the sharing query with a positive response to the AP 130. In various embodiments, the positive response can include an authorization to share data already collected by the wireless network 120 related to the UE 110 or can include additional data specifically requested for sharing. For example, the positive response may permit the wireless network to share the identity of the user (used for gaining access to the wireless network 120) with one or more partners 150, or can include responses to specific queries. The specific queries can request data such as, for example, whether specific application is installed or has been previously activated on the UE 110, whether the UE 110 is located in a specific area, when a specific application is launched or terminated (e.g., to computer usage time) or a duration of usage of the application, capabilities of the UE 110 (e.g., whether augmented reality (AR) applications), whether the UE 110 is paired with an external device (e.g., a screen, watch, glasses, headphones, microphone), etc.

After the UE 110 transmits the positive response, method 300 may restart from block 310 when the AP 130 sends a subsequent request for the UE 110 to share identity data and associated analytics.

At block 340, when the query is not within the user preferences per block 320, the UE 110 ignores the query (sending no response to the sharing query back to the AP 130) or sends a refusal message to the sharing query back to the AP 130. Method 300 may then proceed to block 370 when the AP 130 sends an incentive notification to the UE 110 or method 300 may restart at block 310 when the AP 130 sends a subsequent request for the UE 110 to share identity data, supplemental data (if collected), and associated analytics.

At block 350, the UE 110 responds to the sharing query with a negotiation response to the AP 130, indicating that further information is requested before the UE 110 will provide an affirmative or negative response for authorizing data sharing (per block 330 and block 340, respectively).

At block 360, in response transmitting a preference to negotiate before (further) data sharing with the service provider (per block 350), the UE 110 receives the service provider's sharing policy from an AP 130. In various embodiments, the sharing policy can be via one or several messages from the AP 130 with various levels of detail. The UE 110 can receive general sharing policy details for the service provider or specific policies. For example, the sharing policy may indicate that the collected data are strictly for internal use by the network provider (e.g., for network monitoring/load balancing/analytics/support), to be shared with an explicit list of partners 150, or to be shared with requesting entities at the network provider's discretion (e.g., an undisclosed list of partners 150), and may indicate the particular data types that are to be collected and shared according to each schema.

At block 370, the UE 110 optionally receives an incentive notification from an AP 130. In various embodiments, when the wireless network 120 has one or more incentives available that the UE 110 could qualify for, the AP 130 transmits an incentive notification with or in a separate transmission from the sharing policy details for the wireless network 120. In some embodiments, the sharing incentives are provides in a notice sent before the sharing query or are remembered by the UE 110 from a transmission before the currently analyzed sharing query. In various embodiments, the incentive notification can indicate what data the UE 110 is requested to share (and according to what sharing schema) for a particular incentive (e.g., higher bandwidth, a higher QoE), or as an alert that incentives are available, and that the UE 110 should enter the negotiation process (e.g., per negotiation determination per block 320) to learn details of the incentives or sharing schemas. Method 300 returns to block 320 after block 370 for the UE 110 to analyze whether the sharing preferences have been satisfied in light of the received sharing incentives.

Figure 4A:
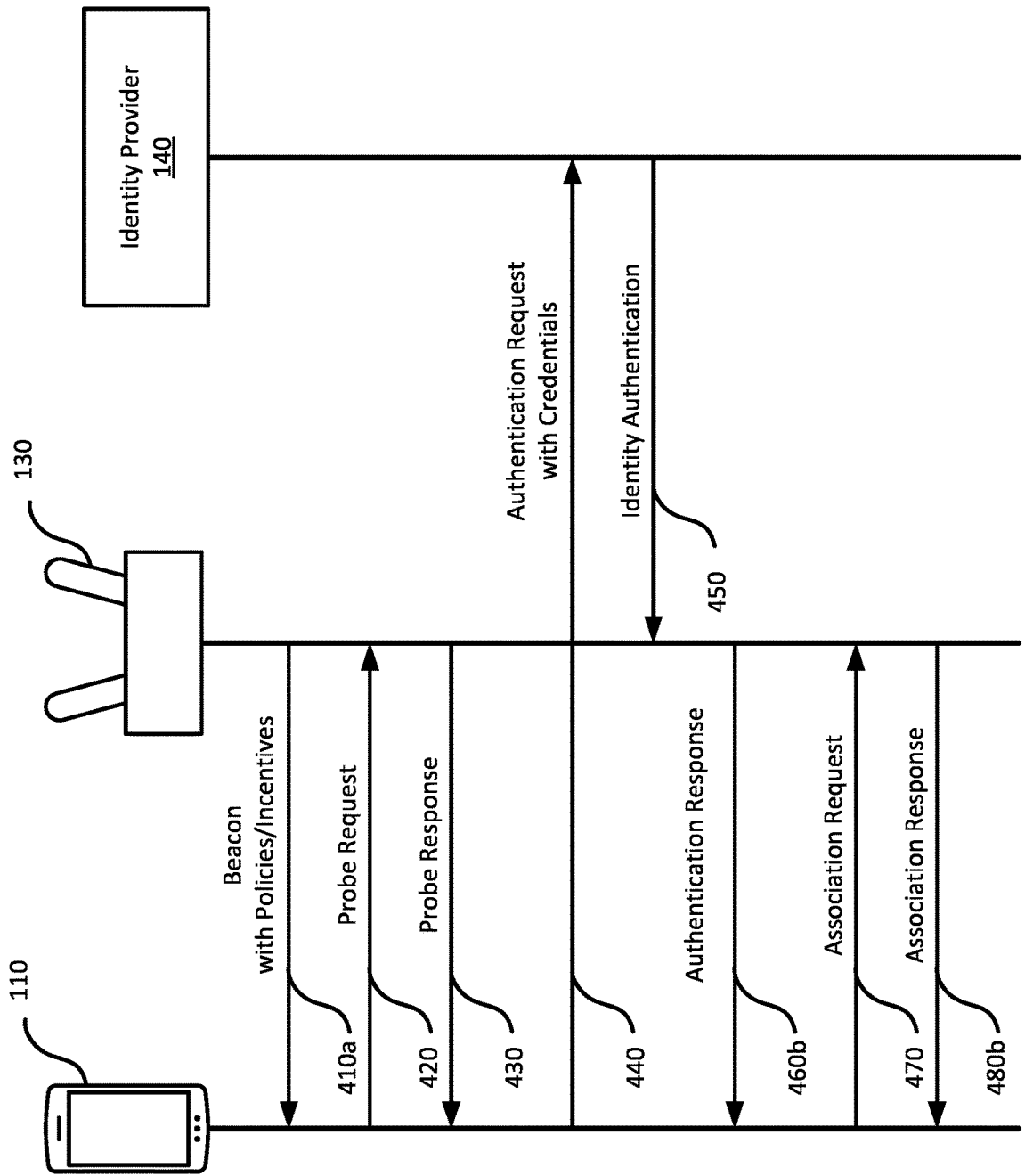
FIGS. 4A-4C are timing diagrams for authenticating a UE with an AP in a wireless network that supports federated identities with data sharing, according to embodiments of the present disclosure.
Figure 4B:
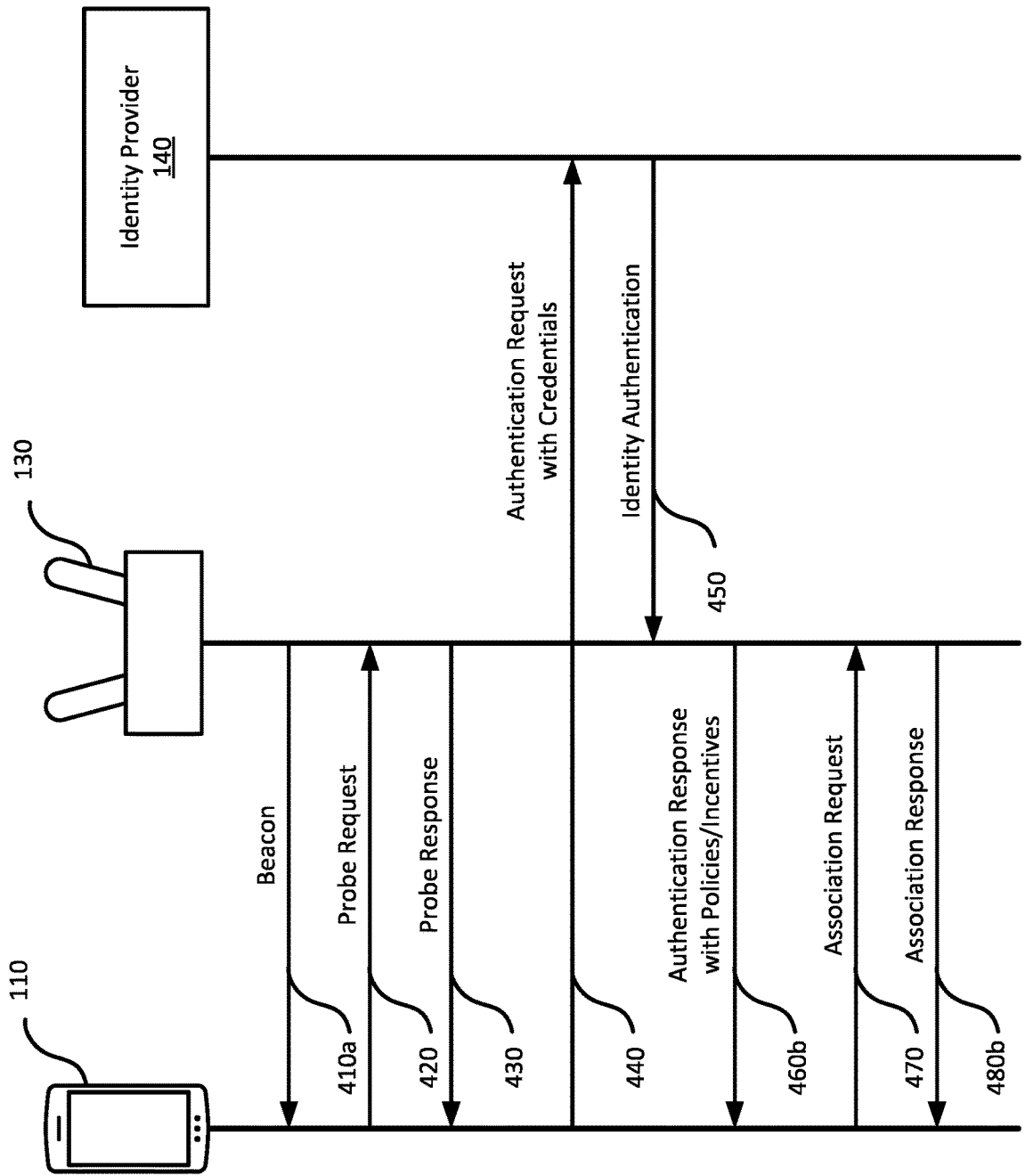
Figure 4C:
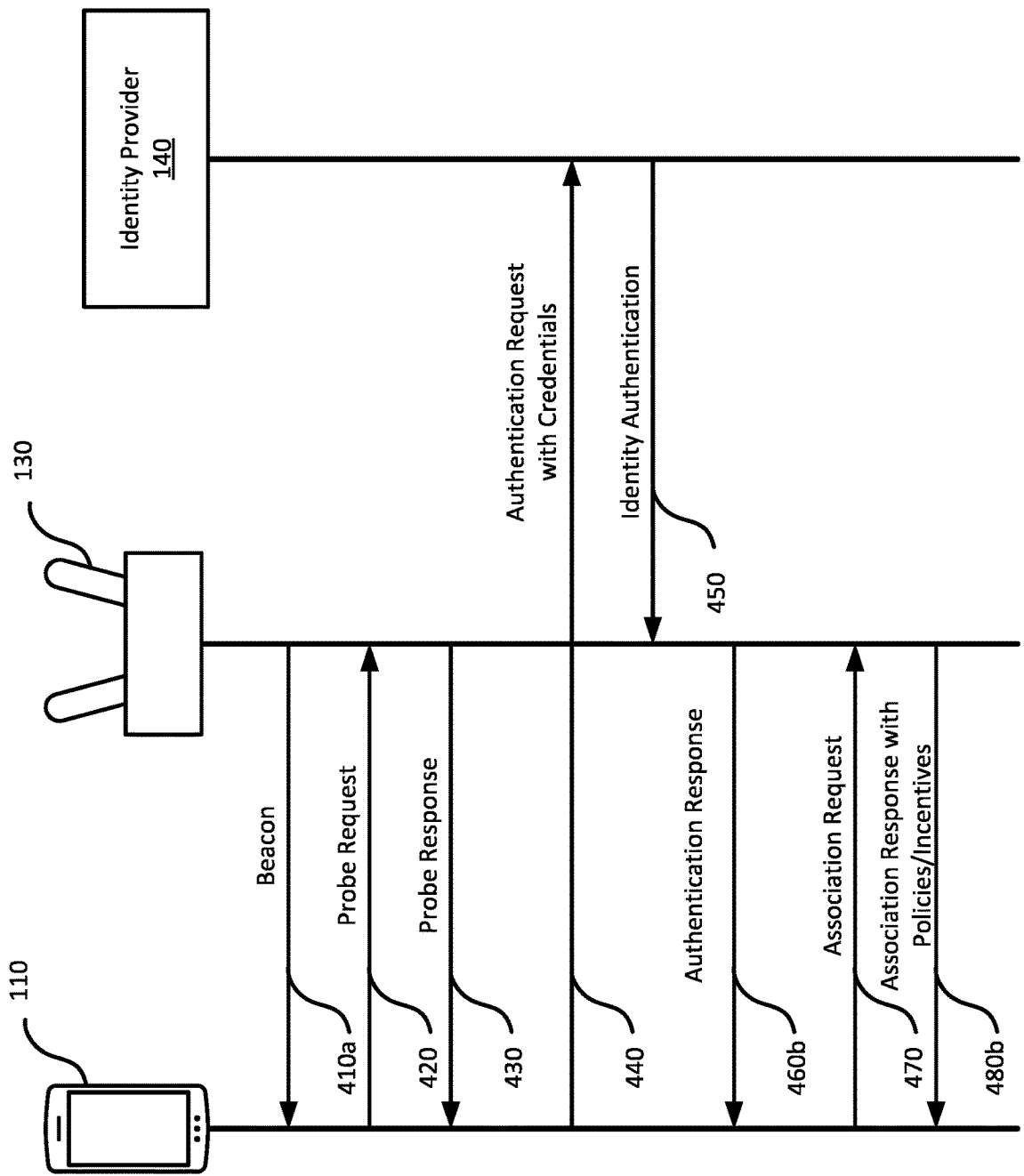

FIGS. 4A-4C are timing diagrams for authenticating a UE 110 with an AP 130 in a wireless network 120 that supports federated identities with data sharing, according to embodiments of the present disclosure.

In various embodiments, a network provider can notifying various UE 110 at several times of support for federated identities in the wireless network 120. The network provider can alert the UE at several different times during the onboarding process that the wireless network 120 supports sharing policies or incentives beyond the baseline use of authenticating the users via supplied identities.

For example, as in FIG. 4A, the network provider can use an augmented beacon frame 410*a* (generally or collectively, beacon frame 410) to notify UEs 110 in the environment 100 of the presence of the wireless network 120 and that the wireless network 120 supports identity sharing (among other aspects or features of the wireless network 120). Alternatively, as in FIGS. 4B and 4C, the network provider can use an unaugmented beacon frame 410*b* that notifies UEs 110 of the presence and capabilities of the wireless network and provide notification of support for sharing identities at another time in the onboarding process. Because the beacon frames 410 are sent periodically (e.g., for continued presence notification and synchronization purposes) and in a broadcast to the environment 100 (and any potential UE 110 therein), the network provider may prefer in some embodiment to provide minimal detail for the support in the beacon frame 410 (e.g., as a flag bit) and provide greater detail later in the onboarding process, as in FIGS. 4B and 4C, to thereby conserve available bandwidth.

In each of the timing diagrams shown in FIGS. 4A-4C the UE 110 and the AP 130 exchange probe requests 420, probe responses 430, and an authorization request 440 as part of onboarding. The AP 130 forwards the authentication request 440, which includes the authorization credentials for a user of the UE 110, to an identity provider 140. The identity provider 140, in turn, based on the supplied credentials, returns a response to the AP 130 (in some embodiments via a network controller 160) indicating whether the user is authenticated via an identity authentication response 450 or via an identity rejection response (not illustrated).

In various embodiments, as in FIG. 4B, the network provider can use an augmented authentication response 460*a* (generally or collectively, authentication response 460) to notify a UE 110 that the associated user has been authenticated by the identity provider 140 and notify the UE 110 that the wireless network 120 supports sharing identities. Alternatively, as in FIGS. 4A and 4C, the network provider can use an unaugmented authentication response 460*b* to notify a UE 110 that the associated user has been authenticated by the identity provider 140, and provide notification of support for sharing identities at another time in the onboarding process. In various embodiments, the augmented authentication response 460*a* includes a notification of support (e.g., via a flag bit) or can include more detailed information about the particular policies and available incentives for identity sharing.

Once authenticated in the wireless network 120, the UE 110 can send an association request 470 to a particular AP 130 in the wireless network 120. In various embodiments, as in FIG. 4C, the network provider can use an augmented association response 480*a* (generally or collectively, association response 480) to confirm association status between the UE 110 and the AP 130 and notify the UE 110 that the wireless network 120 supports sharing identities. Alternatively, as in FIGS. 4A and 4B, the network provider can use an unaugmented association response 480*b* to confirm association status between the UE 110 and the AP 130, and provide notification of support for sharing identities at another time in the onboarding process. In various embodiments, the association response 480*a* includes a notification of support (e.g., via a flag bit) or can include more detailed information about the particular policies and available incentives for identity sharing.

Although each of the timing diagrams in FIGS. 4A-4C show how the AP 130 can notify the UE 110 of support for federated identities and identity sharing at different times, the service provider may freely combine elements from each of FIGS. 4A-4C in other embodiments. For example, the service provider can use an augmented beacon frame 410*a*, an augmented authentication response 460*a*, and an augmented association response 480*a* with different amounts or types of information in each of the augmented transmissions.

Figure 5A:
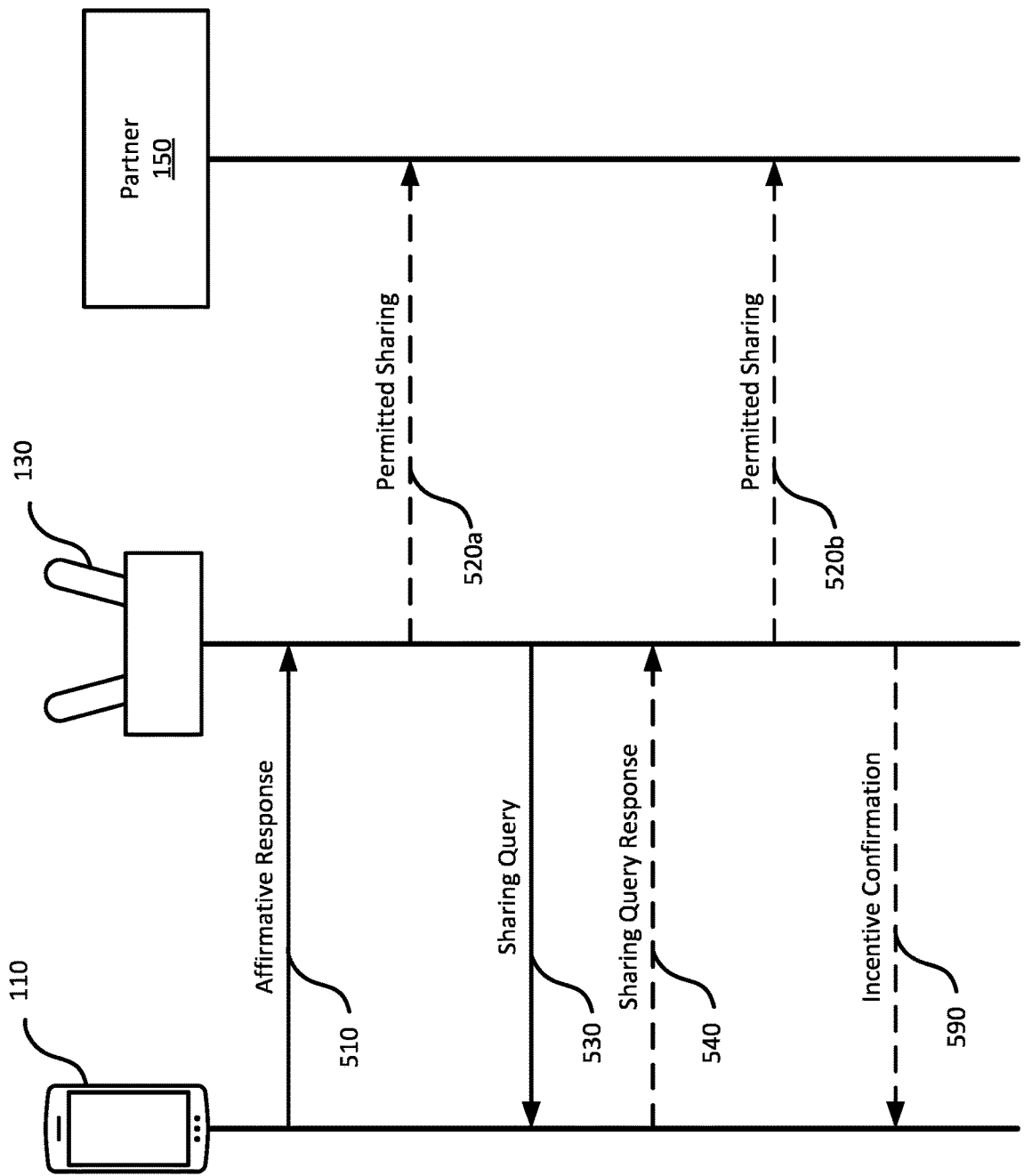
FIGS. 5A-5C are timing diagrams for responding to identity and data sharing requests, according to embodiments of the present disclosure.
Figure 5B:
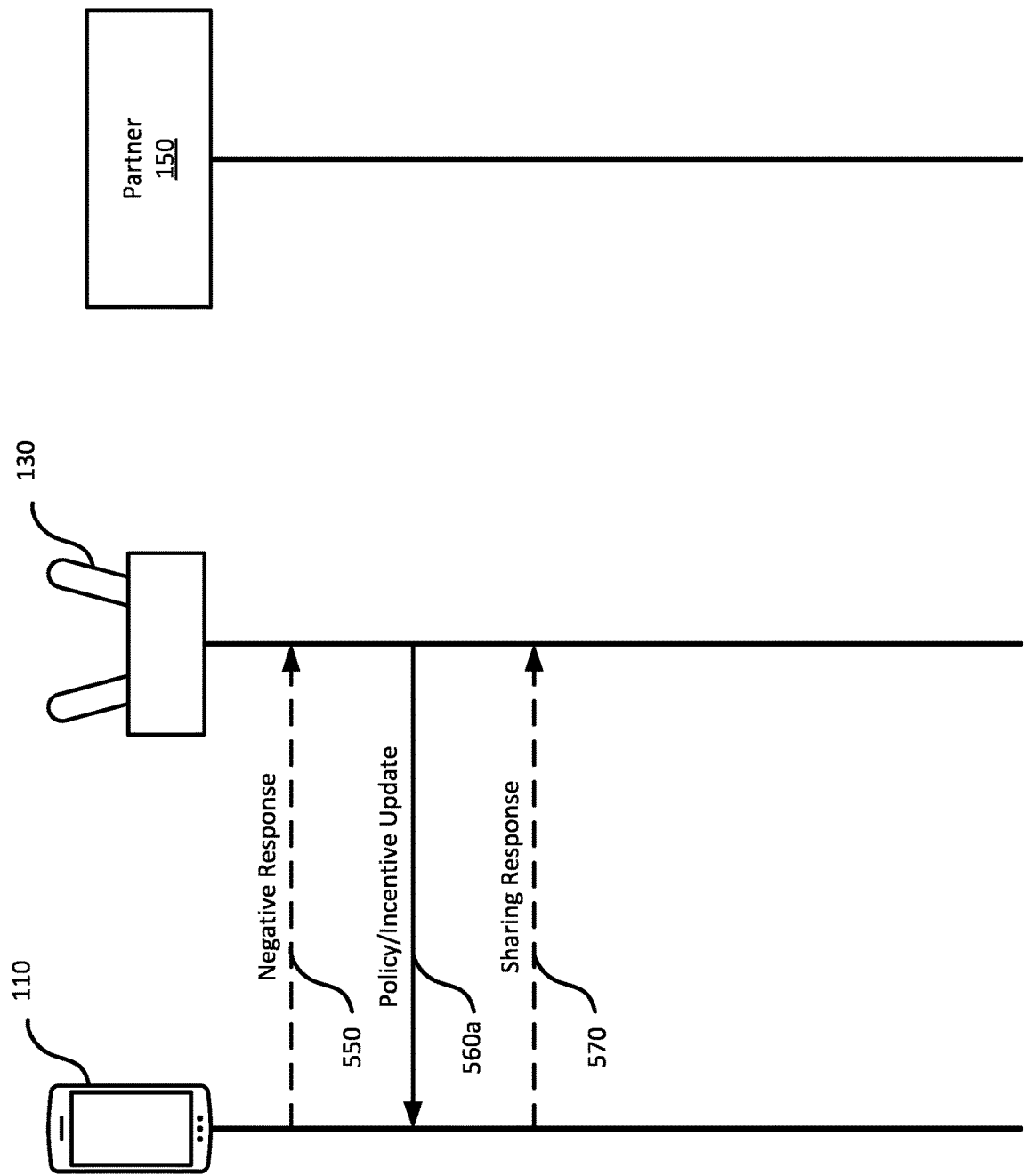
Figure 5C:
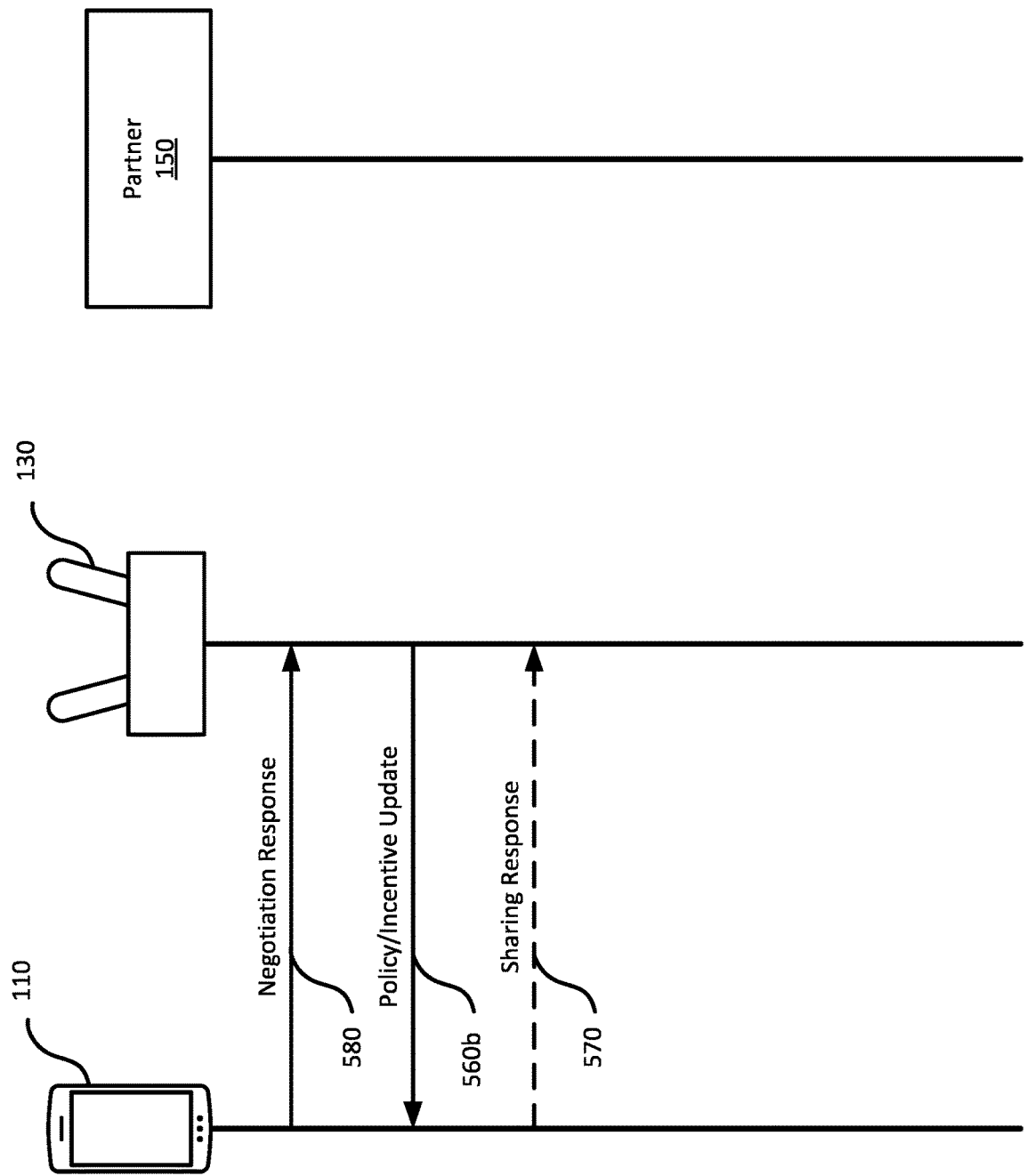

FIGS. 5A-5C are timing diagrams for responding to identity and data sharing requests, according to embodiments of the present disclosure. Although a partner 150 is included in FIGS. 5A-5C, the identity and supplemental data can remain private to the wireless network 120 for internal use when the user provides permission to the network provider for such use.

FIG. 5A illustrates a positive response chain, where the UE 110 has indicated an affirmative response 510 to the AP 130 that at least some data collection and sharing is permitted by the user. In various embodiments, the UE 110 transmits an affirmative response 510 to the AP 130 to indicate that already-collected data, or data collected during the course of providing the wireless networking services according to the published sharing policies are acceptable to the user (e.g., as shared per FIGS. 4A-4C). Accordingly, the AP 130 can collect data to identify the user and data related to the use of the wireless network 120 and forward the data to a partner 150 permitted according to the sharing policies via a first permitted sharing message 520*a* (generally or collectively permitted sharing message).

Additionally or alternatively, the affirmative response 510 can indicate to the AP 130 that the UE 110 permits the receipt of subsequent sharing queries 530 related to the user and use of the UE 110. The subsequent sharing query 530 can be a general sharing query or a specific query. A general sharing query requests that the UE 110 authorize the sharing of some or all of the data collected as part of providing access to the wireless network 120. These data, and related analytics, can include the user identity, user location, data throughput (uplink or downlink) rates, and the like. A specific query can request the UE 110 to supply responsive data related to the operating system, device form factor, additional identities for the user, active (or previously active) applications run by the UE 110, and other data that are in addition to or beyond what is transmitted and collected for provision of the BSS of the wireless network 120.

The UE 110 is free to respond to the subsequent sharing query 530 with an affirmative sharing query response 540 (sharing the data or allowing further queries in a chain requesting specific data), a negative query response 540 (indicating explicitly that the UE 110 will not share the requested data or respond to further queries in a chain requesting specific data), or by not responding, which the AP 130 treats as a negative sharing query response 540 when no reply is received within a given time window. If the AP 130 receives responsive data and permission from the UE 110 in the sharing query response 540 (e.g., an affirmative sharing query response 540), the AP 130 can then share the data with one or more partners 150 via a second permitted sharing message 520b.

Once the requested data are collected for sharing with one or more partners 150, the AP 130 may provide an incentive confirmation 590 to the UE 110. In various embodiments, the AP 130 may provide an incentive that he UE 110 qualifies for without an incentive confirmation 590 (e.g., improving the download speeds of the UE 110 without special notice). In other embodiments, a specific message can be sent to the UE 110 in machine readable format or in human readable format (e.g., a link to a webpage with the incentive or read-out of the incentive) to provide the incentive. Although shown as being provided after the permitted sharing messages 520, in various embodiments the AP 130 can provide the incentive (with or without the incentive confirmation 590) before the collected data are shared with a partner, such as when data are collected and batched for sharing at a later time, but the UE 110 is provided the incentive concurrently with the data collection.

Additionally, as the incentives can changes as more data are collected from the UE 110, the AP 130 may transmit incentive confirmations 590 (or enact various incentives) at different times than those indicated in FIG. 5A.

FIG. 5B illustrates a negative response chain, where the UE 110 has indicated a negative response 550 to the AP 130 to thereby not authorize at least some data collection and sharing on behalf of the user. In various embodiments, the negative response 550 can be a negative sharing query response 540 or a negative response to a request from the AP 130 to collect and share already-collected data, or data collected during the course of providing the wireless networking services according to the published sharing policies are not acceptable to the user (e.g., as shared per FIGS. 4A-4C).

When the user (via the UE 110) has indicated that sharing is not desired via a negative response 550, the AP 130 can send a first policy/incentive update 560a (generally or collectively, policy/incentive update 560) to identify in greater detail what the sharing policies are for the wireless network 120 and any incentives in place to encourage receiving a positive or affirmative response for sharing from the UE 110. In various embodiments, the policy details can be provided in a shared transmission with the incentive details, or in separate transmissions.

In various embodiments, the policy/incentive update 560 indicates what incentives are provided when the UE 110 authorizes sharing of the particular elements of identity data, and can indicate specific incentives or levels of incentives available. For example, incentive A may be provided when the UE 110 authorizes sharing identity data X and incentives A and B may be provided when the UE 110 authorizes sharing identity data X and Y.

In response to receiving a policy/incentive update 560, the UE 110 may transmit a sharing response 570 to update the AP 130 to the user's preferences in light of the policy/incentive update 560. In various embodiments, the sharing response 570 can be positive (allowing the collection and sharing of data in exchange for the incentive or once the policies are better understood by the user), negative (rejecting again the collection and sharing of data), probative (requesting greater detail on the polices or incentives), or absent, which the AP 130 treats as negative when no reply is received within a given time window.

When the sharing response 570 is positive, the response chain may continue as shown in FIG. 5A with the sharing response 570 taking the part of the affirmative response 510. When the sharing response 570 is negative, the response chain may continue as shown in FIG. 5B with the sharing response 570 taking the part of the negative response 550. When the sharing response 570 is probative, the response chain continue as shown in FIG. 5C taking the part of the negotiation response 580.

FIG. 5C illustrates a probative response chain, where the UE 110 requests that the AP 130 provide more information related to the sharing polices and incentives before making a determination to authorize at least some data collection and sharing on behalf of the user. In various embodiments, the negotiation response 580 can be a sharing query response 540 that requests additional information for the UE 110 or a response to a request from the AP 130 to collect and share already-collected data.

When the user (via the UE 110) has indicated that additional information is requested before sharing can be authorized via a negotiation response 580, the AP 130 can send a second policy/incentive update 560b to identify in greater detail what the sharing policies are for the wireless network 120 and any incentives in place to encourage receiving a positive or affirmative response for sharing from the UE 110. In various embodiments, the incentive details can identify various specific incentives for sharing various elements of identity data.

In response to receiving a policy/incentive update 560, the UE 110 may transmit a sharing response 570 to update the AP 130 to the user's preferences in light of the policy/incentive update 560. In various embodiments, the sharing response 570 can be positive (allowing the collection and sharing of data in exchange for the incentive or once the policies are better understood by the user), negative (rejecting again the collection and sharing of data), probative (requesting greater detail on the polices or incentives), or absent, which the AP 130 treats as negative when no reply is received within a given time window.

In various embodiments, the policy/incentive update 560 indicates what the service providers policies are or provides specific answers to questions included in the negotiation response 580. For example, the UE 110 can request additional information on whether partner X is shared with, data element Y is collected, or various other policy concerns, which the policy/incentive update 560 can answer affirmatively or negatively. In another example, the policy/incentive update 560 can provide additional information in general about the sharing policies (e.g., whether data are shared externally, inclusive or exclusive lists of partners 150 that data are shared with, types of data shared, etc.).

When the sharing response 570 is positive, the response chain may continue as shown in FIG. 5A with the sharing response 570 taking the part of the affirmative response 510. When the sharing response 570 is negative, the response chain may continue as shown in FIG. 5B with the sharing response 570 taking the part of the negative response 550. When the sharing response 570 is probative, the response chain continue as shown in FIG. 5C taking the part of the negotiation response 580.

Although illustrated as being shared between one AP 130 and one partner 150, further processing, collection, and analysis can be performed by a network controller 160 (not illustrated in FIGS. 5A-5C) before data are transmitted to a partner 150 (e.g., batching data from several UE 110, anonymizing data, correlating data from several AP 130). Additionally, although shown with respect to a single AP 130 and a single partner in FIGS. 5A-5C, data can be collected by several APs 130 and shared with several partners 150, and the data collected by different APs 130 and shared with different partners 150, and the data collected and shared with a first partner 150a can be the same or different as the data collected and shared with a second partner 150b.

Figure 6:
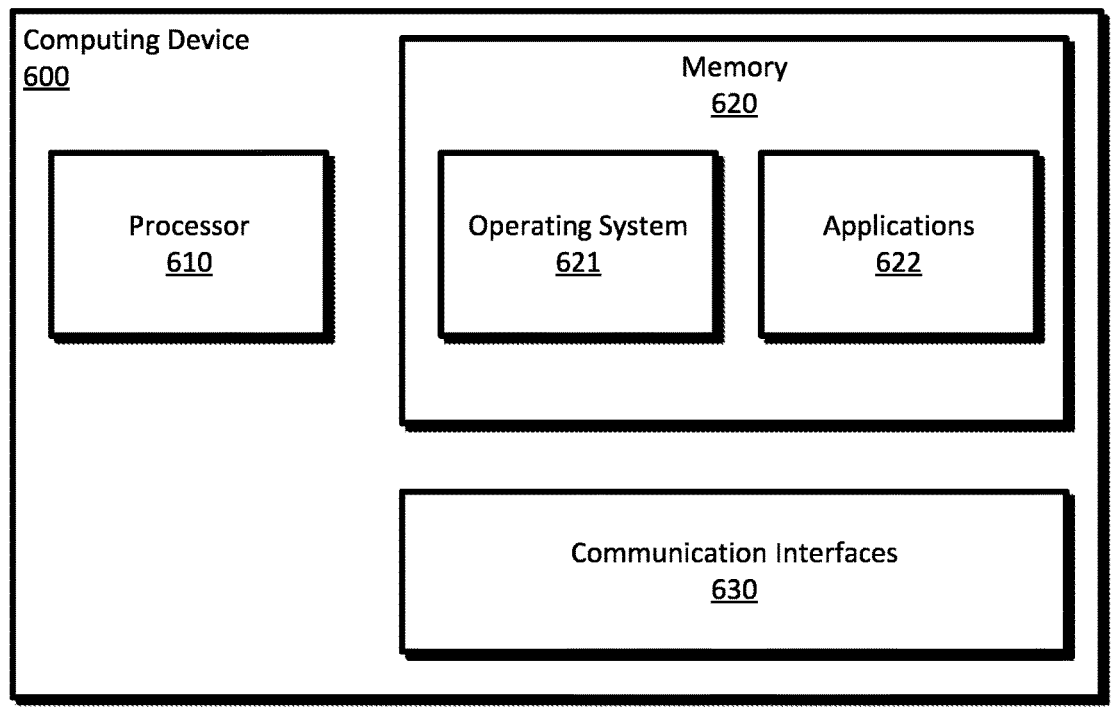
FIG. 6 illustrates hardware of a computing device, according to embodiments of the present disclosure.

FIG. 6 illustrates hardware of a computing device 600 such as can be included in a UE 110, an AP 130, a network controller 160, or a server used to provide the services of an identity provider 140 or partner 150 as described herein. The computing device 600 includes a processor 610, a memory 620, and communication interfaces 630. The processor 610 may be any processing element capable of performing the functions described herein. The processor 610 represents a single processor, multiple processors, a processor with multiple cores, and combinations thereof. The communication interfaces 630 facilitate communications between the computing device 600 and other devices. The communication interfaces 630 are representative of wireless communications antennas (both omnidirectional and directional), various steering mechanisms for the antennas, and various wired communication ports including out-pins and in-pins to a microcontroller. The memory 620 may be either volatile or non-volatile memory and may include RAM, flash, cache, disk drives, and other computer readable memory storage devices. Although shown as a single entity, the memory 620 may be divided into different memory storage elements such as RAM and one or more hard disk drives.

As shown, the memory 620 includes various instructions that are executable by the processor 610 to provide an operating system 621 to manage various functions of the computing device 600 and one or more applications 622 to provide various functionalities to users of the computing device 600, which include one or more of the functions and functionalities described in the present disclosure.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method, comprising:
   receiving, by a User Equipment (UE), a sharing query from an Access Point (AP) indicating that an associated wireless network supports federated identities with data sharing;
   associating, by the UE, to the AP by authenticating an identity of the UE using a federated identity provider;
   after associating to the AP, determining, by the UE, whether the sharing query is within sharing preferences of the UE;
   before transmitting a positive response:
      transmitting, by the UE, a negotiation response to the AP requesting additional details on a sharing policy, wherein the sharing policy comprises guidelines for sharing, after the association, at least one of (i) an identity of the UE or (ii) supplemental data of the UE with one or more partner entities, wherein the one or more partner entities are associated with the AP and distinct from the federated identify provider that authenticated the identity of the UE;
      receiving, by the UE, a policy update from the AP that includes the additional details on the sharing policy, and
      determining, by the UE, whether the sharing query is within the sharing preferences of the UE based on the additional details;
   in response to determining that the sharing query is within the sharing preferences, transmitting, by the UE, to the AP, the positive response for identity sharing that authorizes collection and sharing, after the association, at least one of (i) the identity of the UE or (ii) the supplemental data of the UE with the one or more partner entities identified in the sharing policy; and
   after transmitting the positive response:
      receiving, by the UE, a second sharing query from the AP,
      receiving sharing incentive from the AP, and
      in response to determining that the second sharing query is within the sharing preferences of the UE based on the sharing incentives, transmitting a second positive response to the second sharing query.

2. The method of claim 1, wherein the sharing policy is received in at least one of a beacon frame for the associated wireless network, an authentication response for the associated wireless network, and an association response for associating with the AP in the associated wireless network.

3. The method of claim 1, wherein the policy update includes incentive details for providing various levels of incentives when authorizing sharing at least one of (i) the identity of the UE or (ii) the supplemental data of the UE.

4. The method of claim 1, wherein determining whether the sharing query is within sharing preferences is based on at least one of:
   a user input authorizing or denying requested data for sharing;
   a list of user-defined settings indicating data authorized for sharing; or
   historical user selections to authorize or deny sharing of particular data.

5. The method of claim 1, wherein the sharing query is selected from the group consisting of:
   a general sharing query requesting use of at least one of (i) the identity of the UE or (ii) the supplemental data of the UE; or
   a specific sharing query requesting specific data in addition to at least one of (i) the identity of the UE or (ii) the supplemental data of the UE.

6. A method, comprising:
   transmitting a support notification, via an Access Point (AP), indicating support for federated identities with data sharing within a wireless network associated with the AP;
   associating the AP to a User Equipment (UE) by authenticating an identity of the UE using a federated identity provider;
   after associating to the UE, receiving, by the AP, a first identity sharing preference from the User Equipment (UE) that indicates that negotiation is preferred, transmitting a sharing policy for the wireless network to the UE, wherein the sharing policy comprises guidelines for sharing, after the association, at least one of (i) an identity of the UE or (ii) supplemental data of the UE with one or more partner entities, wherein the one or more partner entities are associated with the AP and distinct from the federated identify provider that authenticated the identity of the UE;
   in response to determining that access incentives are not currently net by the UE, notifying the UE of the access incentives; and
   in response to receiving a second identity sharing preference from the UE indicating that sharing is authorized, sharing, after the association, at least one of (i) the identity of the UE, authenticated by the federated identity provider, or (ii) the supplemental data of the UE to the one or more partner entities indicated in the sharing policy.

7. The method of claim 6, further comprising:
in response to receiving a third identity preference from the UE indicating that sharing is not authorized:
granting access to the wireless network based on the authentication of the identity of the UE by the federated identity provider; collecting the supplemental data of the UE; and
maintaining privacy of the identity of the UE and the supplemental data of the UE.

8. The method of claim 6, wherein the method further comprising:
in response to determining that the access incentives are currently met by the UE, implementing the access incentives for the UE.

9. A device, comprising:
a processor;
a memory including instructions that when executed by the processor configure the device to:
receive a first sharing query from an Access Point (AP) indicating that an associated wireless network supports federated identities with data sharing;
associate to the AP by authenticating an identity of the device using a federated identity provider;
after associating to the AP, determine, by the device, whether the first sharing query is within sharing preferences of the device;
in response to determining that the first sharing query is within the sharing preferences of the device, transmit, to the AP, a positive response for identity sharing that authorizes collection and sharing, after the association, at least one of (i) an identity of the device or (ii) supplemental data of the device with one or more partner entities identified in a sharing policy, wherein the sharing policy comprises guidelines for sharing at least one of (i) the identity of the device or (ii) the supplemental data of the device with the one or more partner entities, wherein the one or more partner entities are associated with the AP and distinct from the federated identify provider that authenticated the identity of the device; and
after transmitting the positive response:
receiving, by the device, a second sharing query from the AP, and
in response to determining that the second sharing query is not within the sharing preferences of the device, responding to the second sharing query with a negative response.

10. The device of claim 9, wherein the sharing policy is received in at least one of a beacon frame for the associated wireless network, an authentication response for the associated wireless network, and an association response for associating with the AP in the associated wireless network.

11. The device of claim 9, wherein the instructions when executed by the processor further configure the device to, before transmitting the positive response:
transmit a negotiation response to the AP requesting additional details on the sharing policy;
receive a policy update from the AP that includes the additional details on the sharing policy; and
determine whether the first sharing query is within the sharing preferences based on the additional details.

12. The device of claim 11, wherein the policy update includes incentive details for providing various levels of incentives when authorizing sharing at least one of (i) the identity of the device or (ii) the supplemental data of the device.

13. The device of claim 9, wherein the instructions when executed by the processor further configure the device to:
receive sharing incentives from the AP; and
in response to determining whether the second sharing query is within the sharing preferences based on the sharing incentives, transmit a second positive response to the second sharing query.

14. The device of claim 9, wherein the first and second sharing query is selected from the group consisting of:
a general sharing query requesting use of at least one of (i) the identity of the device or (ii) the supplemental data of the device; or
a specific sharing query requesting specific data in addition to at least one of (i) the identity of the device or (ii) the supplemental data of the device.

15. The method of claim 1, wherein the sharing preferences are selected from the group consisting of:
general sharing preferences allowing to collect and share at least one of (i) the identity of the UE or (ii) the supplemental data of the UE with an undisclosed list of entities in the sharing policy;
strict sharing preferences allowing to collect and share at least one of (i) the identity of the UE or (ii) the supplemental data of the UE with an explicit list of entities in the sharing policy; and
no sharing preferences that the identity of the UE and the supplemental data of the UE are collected for internal use by the associated wireless network.

16. The method of claim 6, wherein the second identity sharing preference from the UE are selected from the group consisting of:
general sharing preferences allowing to collect and share at least one of (i) the identity of the UE or (ii) the supplemental data of the UE with an undisclosed list of entities in the sharing policy; and
strict sharing preferences allowing to collect and share at least one of (i) the identity of the UE or (ii) the supplemental data of the UE with an explicit list of entities in the sharing policy.

17. The device of claim 9, wherein the sharing preferences are selected from the group consisting of:
general sharing preferences allowing to collect and share at least one of (i) the identity of the device or (ii) the supplemental data of the device with an undisclosed list of entities in the sharing policy;
strict sharing preferences allowing to collect and share at least one of (i) the identity of the device or (ii) the supplemental data of the device with an explicit list of entities in the sharing policy; and
no sharing preferences that the identity of the device and the supplemental data of the device are collected for internal use by the associated wireless network.

18. The method of claim 1, wherein the supplemental data of the UE is gathered by the AP after the association and comprises at least one of (i) location data of the UE, (ii) uplink data throughput rate of the UE, or (iii) downlink data throughput rate of the UE, or (iv) application use statuses of the UE.

* * * * *

UNITED STATES PATENT AND TRADEMARK OFFICE
CERTIFICATE OF CORRECTION

| | | |
|---|---|---|
| PATENT NO. | : 11,979,744 B2 | |
| APPLICATION NO. | : 17/443287 | |
| DATED | : May 7, 2024 | |
| INVENTOR(S) | : Jerome Henry et al. | |

It is certified that error appears in the above-identified patent and that said Letters Patent is hereby corrected as shown below:

In the Claims

In Column 16, Line 59, in Claim 6, delete "net" and insert -- met --.

Signed and Sealed this
Third Day of September, 2024

Katherine Kelly Vidal
*Director of the United States Patent and Trademark Office*